United States Patent
Uysal et al.

(10) Patent No.: US 11,852,064 B2
(45) Date of Patent: Dec. 26, 2023

(54) EXHAUST GAS HEATER

(71) Applicant: Purem GmbH, Neunkirchen (DE)

(72) Inventors: Fatih Uysal, Plochingen (DE); Sandra Hoeckel, Esslingen am Neckar (DE); Dietmar Kuschel, Murr (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/694,216

(22) Filed: Mar. 14, 2022

(65) Prior Publication Data

US 2022/0290595 A1    Sep. 15, 2022

(30) Foreign Application Priority Data

Mar. 15, 2021  (DE) ............ 10 2021 106 168.7
Apr. 16, 2021  (DE) ............ 10 2021 109 568.9

(51) Int. Cl.
*F01N 3/20*  (2006.01)
*H05B 3/06*  (2006.01)
*F01N 3/027*  (2006.01)
*B01D 53/94*  (2006.01)

(52) U.S. Cl.
CPC .......... *F01N 3/2013* (2013.01); *F01N 3/027* (2013.01); *H05B 3/06* (2013.01); *B01D 53/94* (2013.01); *H05B 2203/007* (2013.01); *H05B 2203/017* (2013.01)

(58) Field of Classification Search
CPC .... F01N 3/2013; F01N 3/027; F01N 2240/16; H05B 3/06; H05B 2203/007; H05B 2203/017; B01D 53/94; Y02T 10/12
See application file for complete search history.

(56) References Cited

U.S. PATENT DOCUMENTS

2014/0190151 A1* 7/2014 Culbertson ............ H05B 3/44
                                                         60/303
2020/0072107 A1* 3/2020 Aufranc ............... F01N 3/2013
(Continued)

FOREIGN PATENT DOCUMENTS

CN       110139972 A      8/2019
DE   10 2020 123 376 A1   3/2022
(Continued)

OTHER PUBLICATIONS

Examination Report of the Indian Patent Office dated Oct. 20, 2022 for parallel Indian application 202234013314.
(Continued)

*Primary Examiner* — Brandon D Lee
(74) *Attorney, Agent, or Firm* — Walter Ottesen, P.A.

(57) ABSTRACT

An exhaust gas heater for an exhaust gas system of an internal combustion engine includes a carrier arrangement and a heating conductor arrangement. The heating conductor arrangement is carried on the carrier arrangement and exhaust gas can flow therethrough in a main exhaust gas flow direction. The heating conductor arrangement includes at least two heating conductors arranged following one another in the main exhaust gas flow direction. The carrier arrangement includes at least one carrier element having a fixing region lying radially on the outside relative to an exhaust gas heater center axis and is configured for fixing to an exhaust gas guidance housing. The fixing region at least partially does not radially overlap a radially outer lying conductor region of at least one heating conductor of the heating conductor arrangement in at least one, preferably several circumferential regions.

16 Claims, 13 Drawing Sheets

(56) References Cited

U.S. PATENT DOCUMENTS

| | | |
|---|---|---|
| 2020/0240305 A1 | 7/2020 | Gaiser |
| 2020/0309006 A1 | 10/2020 | Gidney et al. |
| 2021/0003056 A1* | 1/2021 | Huang ................ F01N 3/0807 |
| 2021/0123369 A1* | 4/2021 | Sommier ............. F01N 3/2807 |
| 2022/0074333 A1 | 3/2022 | Hoeckel et al. |
| 2022/0251991 A1 | 8/2022 | Grussmann et al. |

FOREIGN PATENT DOCUMENTS

| | | |
|---|---|---|
| EP | 0 608 783 A1 | 8/1994 |
| EP | 3 686 405 A1 | 7/2020 |
| JP | 61-80785 A | 4/1986 |
| JP | H05-59939 A | 3/1993 |
| JP | 2002-373862 A | 12/2002 |
| JP | 2016-503854 A | 2/2016 |
| JP | 2022-123833 A | 8/2022 |
| WO | 2004/112433 A1 | 12/2004 |
| WO | 2018/080578 A1 | 5/2018 |

OTHER PUBLICATIONS

Machine translation into English and Office Action of the Japanese Patent Office dated Feb. 21, 2023 for parallel Japanese application 2022-039270.

Translation into English of Office Action of the Chinese Patent Office dated Aug. 30, 2023 for parallel Chinese application 202210217863.9.

* cited by examiner

EXHAUST GAS HEATER

CROSS REFERENCE TO RELATED APPLICATIONS

This application claims priority of German patent application nos. 10 2021 106 168.7, filed Mar. 15, 2021, and 10 2021 109 568.9, filed Apr. 16, 2021, the entire contents of which are incorporated herein by reference.

TECHNICAL FIELD

The present disclosure concerns an exhaust gas heater for an exhaust gas system of an internal combustion engine, including a carrier arrangement and a heating conductor arrangement, which is carried on the carrier arrangement and through which exhaust gas can flow in a main exhaust gas flow direction and which has at least one heating conductor through which current flows, wherein the at least one heating conductor is produced by cutting out of a flat metal material.

BACKGROUND

Such an exhaust gas heater is known from United States patent application publication US 2022/0074333. By providing a heating conductor, carried between two carrier elements, by cutting out of a flat metal material, for example by cutting or punching such a heating conductor from a plate-like blank of the flat metal material, it is possible to provide such a heating conductor with almost arbitrary, comparatively complex contour and in particular also varying cross-sectional area, and hence also locally varying resistance, and thereby adapt this to the flow conditions prevailing in an exhaust gas guidance housing of an exhaust gas system.

SUMMARY

It is an object of the present disclosure to provide an exhaust gas heater for an exhaust gas system of an internal combustion engine which has increased efficiency in the transmission of heat to exhaust gas flowing therethrough.

According to the disclosure, this object is achieved by an exhaust gas heater for an exhaust gas system of an internal combustion engine, including a carrier arrangement and a heating conductor arrangement, which is carried on the carrier arrangement and through which exhaust gas can flow in a main exhaust gas flow direction and which has at least one heating conductor through which current flows, wherein the at least one heating conductor is produced by cutting out of a flat metal material,
wherein:
the heating conductor arrangement includes at least two heating conductors arranged following one another in the main exhaust gas flow direction,
and/or
the carrier arrangement includes at least one carrier element having a fixing region which lies radially on the outside relative to an exhaust gas heater center axis and is configured for fixing to an exhaust gas guidance housing, wherein the fixing region at least partially does not radially overlap a radially outer lying conductor region of at least one heating conductor of the heating conductor arrangement in at least one, preferably several circumferential regions.

By the provision of several heating conductors following one another in the main exhaust gas flow direction, the surface area at which heat can be transmitted to the exhaust gas flowing through the exhaust gas heater is significantly enlarged, wherein because the exhaust gas heater itself is provided by cutting out of a flat metal material, by arranging several such heating conductors one behind the other, the installation size of an exhaust gas heater constructed in this fashion does not substantially increase. With such an embodiment, the various heating conductors, which are in principle not sheathed in electrical insulation, may be constructed from the same or different electrically conductive materials, and may be configured or arranged such that they have a targeted influence on the flow guidance of the exhaust gas stream. Also, different heating conductors may be configured differently, for example also with different dimensions in order for example to achieve an adaptation to a hopper-like structure of an exhaust gas guidance housing.

By configuring the carrier arrangement such that this at least partially does not radially overlap a heating conductor in a circumferential region or several circumferential regions, that is, at least partially does not shield this against the exhaust gas contact flow or passing flow, it becomes possible to ensure a thermal interaction between the exhaust gas and the heating conductor also in the radially outer region, so that with this measure the surface area of the heating conductor, which can efficiently be used for heat transmission, can be enlarged without an increase in installation size.

Each of the two measures presented above alone leads to an increased heat transmission capacity of an exhaust gas heater constructed in this fashion, and may therefore be implemented independently in an exhaust gas heater according to the principles of the present disclosure. It can be particularly advantageous if both measures are provided in combination in an exhaust gas heater.

In order to achieve as large as possible a surface area of the heating conductor for thermal interaction with the exhaust gas, in the cross-sectional area of an exhaust gas guidance housing through which exhaust gas can flow, it is proposed that at least one, preferably each heating conductor of the heating conductor arrangement is configured so as to extend as a winding at least in regions. For this, it may for example be provided that at least one, preferably each heating conductor of the heating conductor arrangement has at least one meander winding field, preferably a plurality of meander winding fields following one another in the circumferential direction, wherein each meander winding field includes a plurality of meander winding portions arranged radially following one another relative to the exhaust gas heater center axis and extending substantially in the circumferential direction, wherein at least one, preferably several meander winding portions at a first peripheral end adjoin a radially further inwardly positioned meander winding portion and/or at a second peripheral end adjoin a radially further outwardly positioned meander winding portion.

When the heating conductor arrangement is configured with at least two heating conductors arranged following one another in the main exhaust gas flow direction, at least two heating conductors may be electrically interconnected in series and/or at least two heating conductors may be electrically interconnected in parallel.

To connect the heating conductors electrically to a voltage source or to one another, it is proposed that in the case of a first heating conductor of the at least two heating conductors, a radially outer meander winding portion of a meander winding field provides a first connecting region of the first heating conductor, and a radially outer meander winding portion of another meander winding field provides a second connecting region of the first heating conductor; and in the case of a second heating conductor of the at least two heating conductors, a radially outer meander winding portion of a meander winding field provides a first connecting region of the second heating conductor, and a radially outer meander winding portion of another meander winding field provides a second connecting region of the second heating conductor; and in the case of the first heating conductor and the second heating conductor, respectively at least one connecting region of the first connecting region and the second connecting region provides a voltage source connecting region for connection of the heating conductor arrangement to a voltage source; and/or in the case of the first heating conductor and the second heating conductor, respectively a connecting region of the first connecting region and the second connecting region provides a contact connecting region for serial electrical connection of the first heating conductor to the second heating conductor.

The efficient flow of exhaust gas around the heating conductor may be further improved if, when the heating conductor arrangement is configured with at least two heating conductors arranged following one another in the main exhaust gas flow direction, at least two heating conductors are arranged so as not to be congruent with one another transversely to the main exhaust gas flow direction. This means that a heating conductor positioned further downstream does not or does not completely lie in the flow shadow of a heating conductor positioned further upstream, but protrudes beyond this at least in regions transversely to the main exhaust gas flow direction, and thus is not covered thereby and shielded from the exhaust gas contact flow. For a stable positioning, it is here advantageous if the heating conductors of the heating conductor arrangement, which are arranged following one another in the main exhaust gas flow direction, are carried between carrier elements of the carrier arrangement.

To increase the stability, when the heating conductor arrangement is configured with at least two heating conductors arranged following one another in the main exhaust gas flow direction, at least two heating conductors may be supported relative to one another by at least one, preferably a plurality of bracing elements.

Here, at least one, preferably each bracing element may extend between meander winding portions of two heating conductors.

In particular when the heating conductors supported relative to one another by one or more bracing elements are connected in parallel, such bracing elements, which contribute also to increasing the surface area usable for heat transmission, may be made of metal material and be connected to the heating conductors by metal bonding, for example by welding or soldering.

When the heating conductors are configured with one or more meander winding fields, a complete mutual covering against exhaust gas contact flow may be avoided if in at least one, preferably each meander winding field, at least one, preferably a plurality of meander winding portions of one of the heating conductors is not congruent, transversely to the main exhaust gas flow direction, with a meander winding portion, following in the main exhaust gas flow direction, of another of the heating conductors.

When at least one carrier element is configured with a radially outer lying conductor region of at least one heating conductor of the heating conductor arrangement, in at least one fixing region at least partially not radially overlapping a circumferential region, the at least one carrier element may include a plurality of carrier arms which are arranged spaced apart from one another in the circumferential direction and each provide radially outwardly a fixing portion of the fixing region.

In order not to cover or not completely cover, against the exhaust gas contact flow, the region of a radially outer lying conductor region of the heating conductor lying between two such carrier arms, it may be provided that there is no connection in the circumferential direction between the fixing portions of at least two carrier arms following one another in the circumferential direction, preferably of all carrier arms following one another in the circumferential direction.

Alternatively or additionally, in the allocation to the carrier arms, it may be provided that the fixing portions of at least two carrier arms following one another in the circumferential direction, preferably of all carrier arms following one another in the circumferential direction, are connected together in the circumferential direction by a fixing edge. Such a fixing edge contributes radially outwardly to the stiffening of a carrier element, but however is dimensioned such that the radially outer lying conductor region is not covered or not completely covered in the region between the two carrier arms connected thereby.

To achieve a stable construction, it is proposed that the carrier arms of the at least one carrier element extend radially outwardly from a central region of the at least one carrier element, and/or at least one connecting formation is provided at least on some of the carrier arms of the at least one carrier element, and/or on a central region of the at least one carrier element, for fixedly connecting the at least one carrier element to the heating conductor arrangement.

In order to avoid the occurrence of heat build-up in regions in which, unavoidably, the radially outer conductor region must also be covered by a carrier arm, it is furthermore proposed that at least the heating conductor has a greater conductor cross-sectional area in a region covered by a carrier arm than in a region not covered by a carrier arm. In the covered region, because of the larger cross-sectional area, the heating conductor has a lower resistance so that less heat is generated there. Such a structure can preferably be provided in a radially outer conductor region of a heating conductor, in particular in a radially outer meander winding portion of at least one meander winding field.

A stable structure may be further supported in that an upstream carrier element and a downstream carrier element are provided, wherein the heating conductor arrangement is arranged between the upstream carrier element and the downstream carrier element in the main exhaust gas flow direction. The heating conductor arrangement is evidently also kept electrically insulated relative to the carrier elements which are constructed for example from the sheet metal material.

In an embodiment, it may be provided that at least one carrier element substantially shields at least one voltage source connecting region of the heating conductor arrangement from direct exhaust gas contact flow. In the region of the connection of the heating conductor arrangement to a connecting element passing through the exhaust gas guidance housing, generally less heat is provided than in the conductor regions of the heating conductor arrangement provided for thermal interaction with the exhaust gas. Because of the shielding of this region from exhaust gas through-flow, it is avoided that exhaust gas flowing in this region is heated less greatly than exhaust gas flowing in other regions.

The disclosure furthermore concerns an exhaust gas heating arrangement for an exhaust gas system of an internal combustion engine, including at least one exhaust gas heater constructed according to the disclosure, carried on an exhaust gas guidance housing.

The disclosure furthermore concerns an exhaust gas system for an internal combustion engine, including at least one exhaust gas heater constructed according to the disclosure and arranged on an exhaust gas guidance housing, and at least one exhaust gas treatment arrangement downstream of the exhaust gas heater.

BRIEF DESCRIPTION OF THE DRAWINGS

The invention will now be described with reference to the drawings wherein.

DESCRIPTION OF THE PREFERRED EMBODIMENTS

Figure 1:
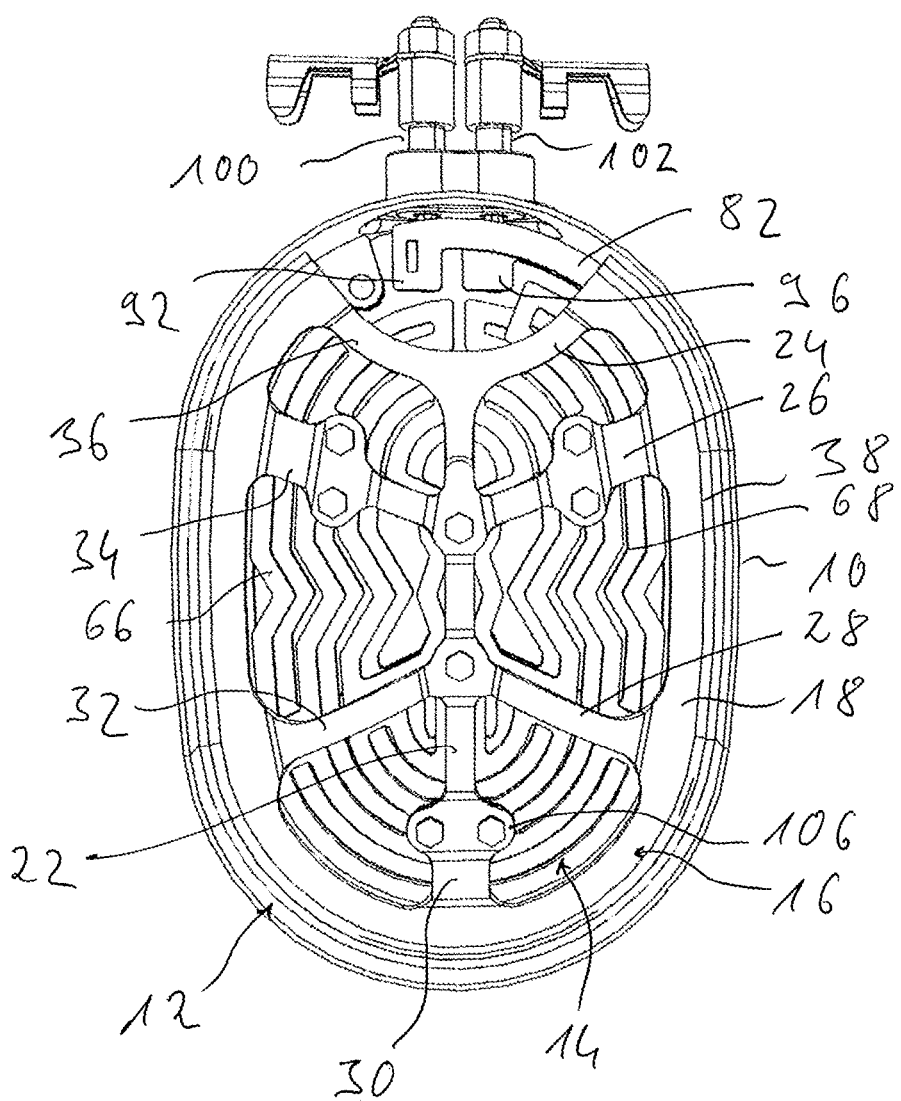
FIG. 1 is a view of an exhaust gas heater in an exhaust gas guidance housing, viewed in a main exhaust gas flow direction.

FIGS. 1 to 7 show a first embodiment of an exhaust gas heater 12, inserted in, for example, a tubular exhaust gas guidance housing 10 which is elongate at least in portions in the direction of an exhaust gas heater center axis A. The exhaust gas heater 12 includes a heating conductor arrangement (generally designated with 14) which is carried by a carrier arrangement 16 on the exhaust gas guidance housing 10.

The carrier arrangement 16 includes two disk-like carrier elements 18, 20 which are identical to one another and formed for example from sheet metal material. The carrier elements 18, 20 are constructed with a central region 22 extending substantially transversely to the exhaust gas heater center axis A, and a plurality of carrier arms 24, 26, 28, 30, 32, 34, 36 extending in the radially outward direction from the central region 22. In an outer peripheral region of the carrier elements 18, 20, a fixing region (generally designated with 38) is formed, via which the carrier elements 18, 20 and hence the entire exhaust gas heater 12 can be attached to the inner surface of the exhaust gas guidance housing 10, for example, by welding. The two carrier elements 18, 20 are bent round in the axial direction in this fixing region 38.

In the region of each of the carrier arms 24, 26, 28, 30, 32, 34, 36, the fixing region 38 has a respective fixing portion 40, 42, 44, 46, 48, 50, 52. Between two fixing portions 40, 42, 44, 46, 48, 50, 52, each forming a radially outer end region of a carrier arm 24, 26, 28, 30, 32, 34, 36, a fixing edge 54, 56, 58, 60, 62, 64 is formed connecting the fixing portions of two adjacent carrier arms, so that the fixing portions 40, 42, 44, 46, 48, 50, 52, with the fixing edges 54, 56, 58, 60, 62, 64 extending in between and connecting together adjacent carrier arms 24, 26, 28, 30, 32, 34, 36, provide a circumferentially substantially continuous structure of the fixing region 38. There is no fixing edge only between the two carrier arms 24, 36—or their fixing portions 40, 52—shown at the top in FIG. 4.

Because of the configuration of the carrier arms 24, 26, 28, 30, 32, 34, 36 and also of the fixing region 38, a targeted flow guidance is achieved for the exhaust gas flowing through the exhaust gas heater 12. In particular, the carrier arms 24, 26, 28, 30, 32, 34, 36 may cover regions which should be protected against direct contact flow. These may for example be regions in which sensors are arranged, for example, for temperature detection or detection of an exhaust gas composition. The fixing region 38, which is substantially continuous in the manner of a ring, prevents flow in the radially outer region directly along a comparatively cold inner surface of an exhaust gas guidance housing containing the exhaust gas heater 12.

Figure 5:
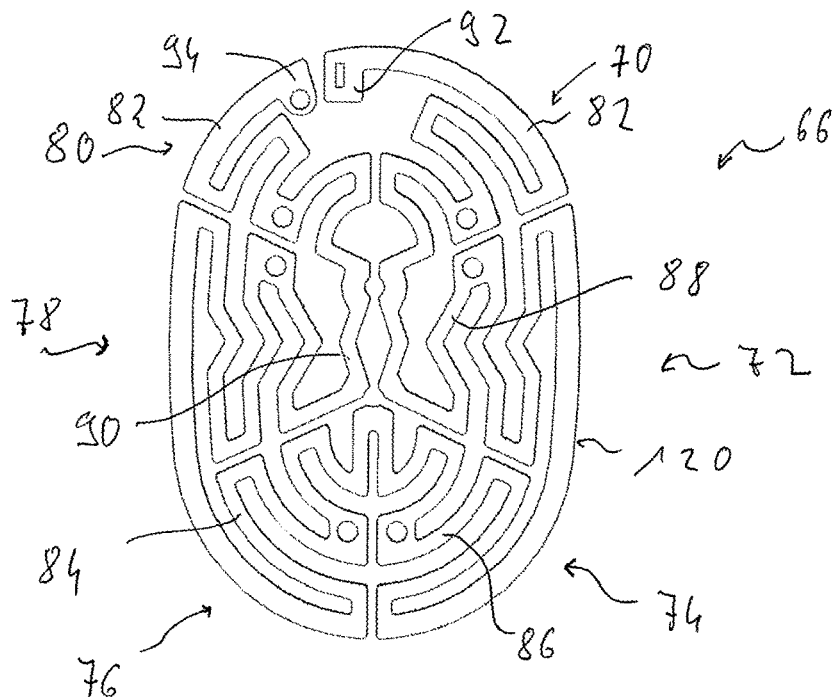
FIG. 5 is a first heating conductor, to be positioned further upstream, of a heating conductor arrangement of the exhaust gas heater from FIG. 1.
Figure 6:
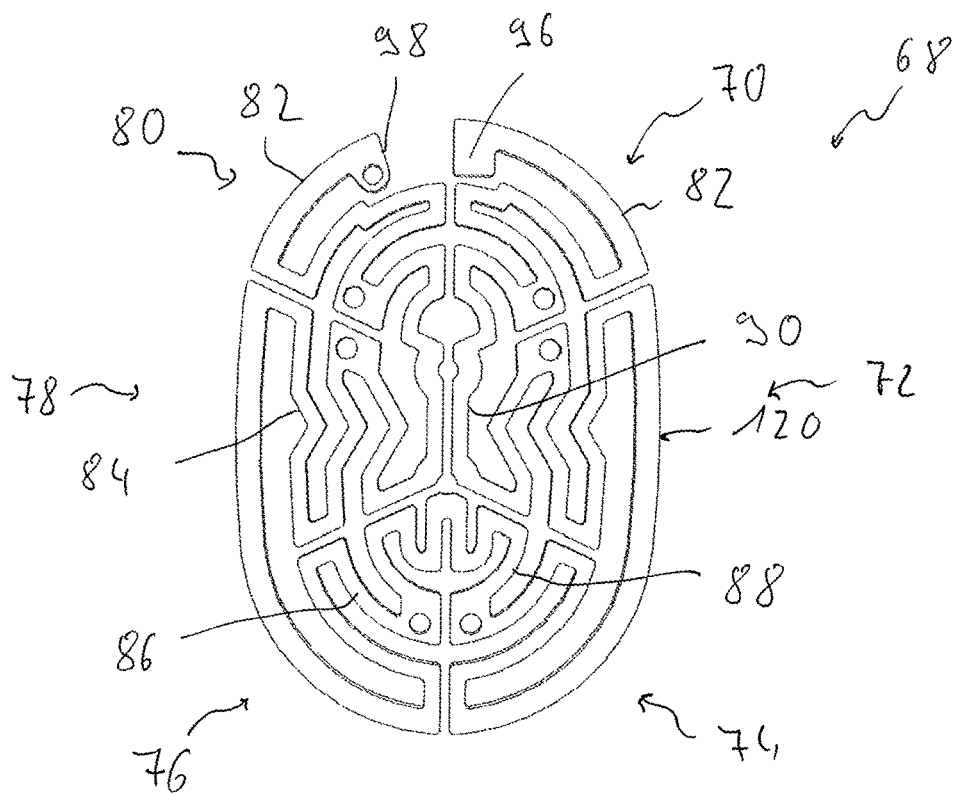
FIG. 6 is a second heating conductor, to be positioned further downstream, of the heating conductor arrangement of the exhaust gas heater from FIG. 1.

FIGS. 5 and 6 show an upstream first heating conductor 66 and a downstream second heating conductor 68 of the heating conductor arrangement 14. Each of the two heating conductors 66, 68, which in principle are not sheathed with electrically insulating material, is produced by cutting out, for example, punching or cutting, such as for example laser cutting or waterjet cutting, from a flat metal material; it also has an outer peripheral contour which is adapted to the inner peripheral contour of the exhaust gas guidance housing 10 and, in the embodiment shown, is round with flattenings. Each of the two heating conductors 66, 68 is made from a plurality of meander winding fields 70, 72, 74, 76, 78, 80 following one another in the circumferential direction, wherein in each of the meander winding fields 70, 72, 74, 76, 78, 80, meander winding portions 82, 84, 86, 88, 90 are provided which are substantially staggered radially relative to one another and extend approximately in the circumferential direction. In one of their peripheral end regions, the meander winding portions 84, 86, 88, 90 are each connected to a meander winding portion 82, 84, 86, 88 positioned further radially outward. In another peripheral end region, the meander winding portions 82, 84, 86, 88 are each connected to a meander winding portion 84, 86, 88, 90 lying radially further inward. The respective radially outer meander winding portions 82 of the meander winding fields 72, 74, 76, 78 connect together meander winding fields which are directly adjacent to one another. Similarly, the radially inner meander winding portions 90 of the meander winding fields 70, 72, 74, 76, 78, 80 connect together meander winding fields which are directly adjacent one another, so that overall a serial electrical circuit of the meander winding fields 70, 72, 74, 76, 78, 80 is obtained.

Although the production of such heating conductors 66, 68 by cutting out of a flat material provides the possibility, in a particularly simple and economic fashion, of providing the heating conductors 66, 68 with a comparatively complex structure of their meander winding portions, in principle also other production processes are possible, such as, for example, metal injection molding or sintering, for obtaining such heating conductors 66, 68.

The radially outer meander winding portions 82 of the meander winding fields 70, 80 of the first heating conductor 66 provide respectively a first connecting region 92 and a second connecting region 94 of the first heating conductor 66. Similarly, the radially outer meander winding portions 82 of the meander winding fields 70, 80 of the second heating conductor 68 provide a first connecting region 96 and a second connecting region 98 of the second heating conductor 68. With their first connecting regions 92, 96, the heating conductors 66, 68 each provide a voltage source connecting region, by means of which the heating conductors can be connected to a voltage source, for example via connecting elements 100, 102 which penetrate the exhaust gas guidance housing 10 in an electrically insulated and gas-tight fashion. With their second connecting regions 94, 98, the two heating conductors 66, 68 provide contact connecting regions in which the two heating conductors 66, 68 may be interconnected electrically conductively, for example, by a rivet bolt or welding or similar, so that in this embodiment, an electric serial circuit of the two heating conductors is achieved. In the area of the connecting regions 92, 94, 96, 98, the heating conductors 66, 68, or their respective radially outer meander winding portions 82, have a comparatively large width in order, because of the locally lower electrical resistance in these regions which are shielded from exhaust gas contact flow, to reduce the generation of heat in comparison with the regions which are open to contact flow.

In an alternative embodiment, for each of the heating conductors 66, 68, the second connecting regions 94, 98 may also provide voltage source connecting regions so that, for example, the two first connecting regions 92, 96 of the two heating conductors 66, 68 can be connected to the connecting element 100, and via this to a voltage source, while the second connecting regions 94, 98 of the two heating conductors 66, 68 can be connected together and, via the connecting element 102, to the voltage source, so that an electrically parallel circuit of the heating conductors 66, 68 is achieved. In particular when a parallel circuit of the two heating conductors 66, 68 is selected, a self-regulation of the heating conductors 66, 68 is achieved if these are exposed to different exhaust gas temperatures and thereby locally different electrical resistances of the heating conductors 66, 68 occur.

Figure 7:
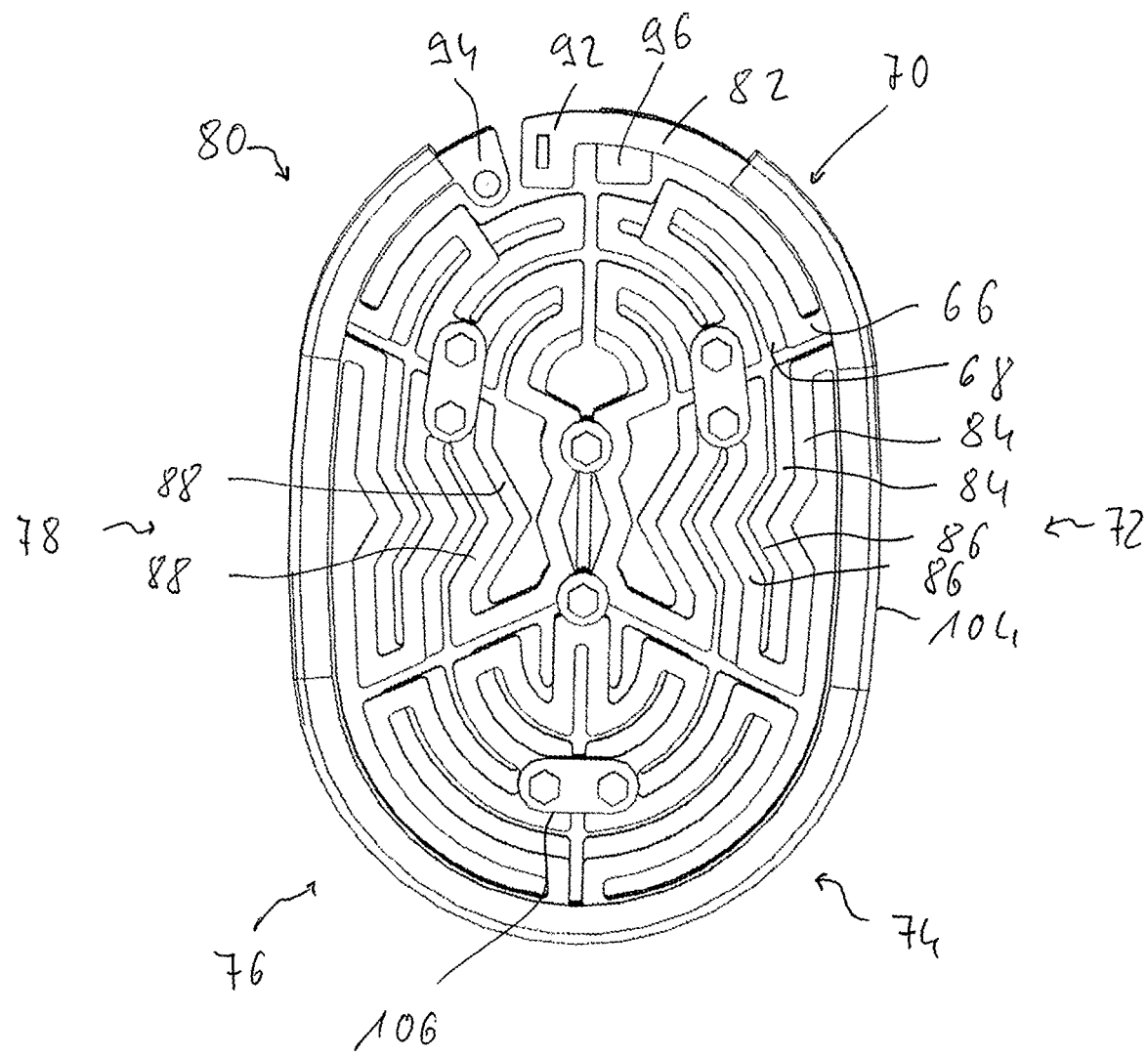
FIG. 7 shows the heating conductors from FIGS. 5 and 6 together.
Figure 8:
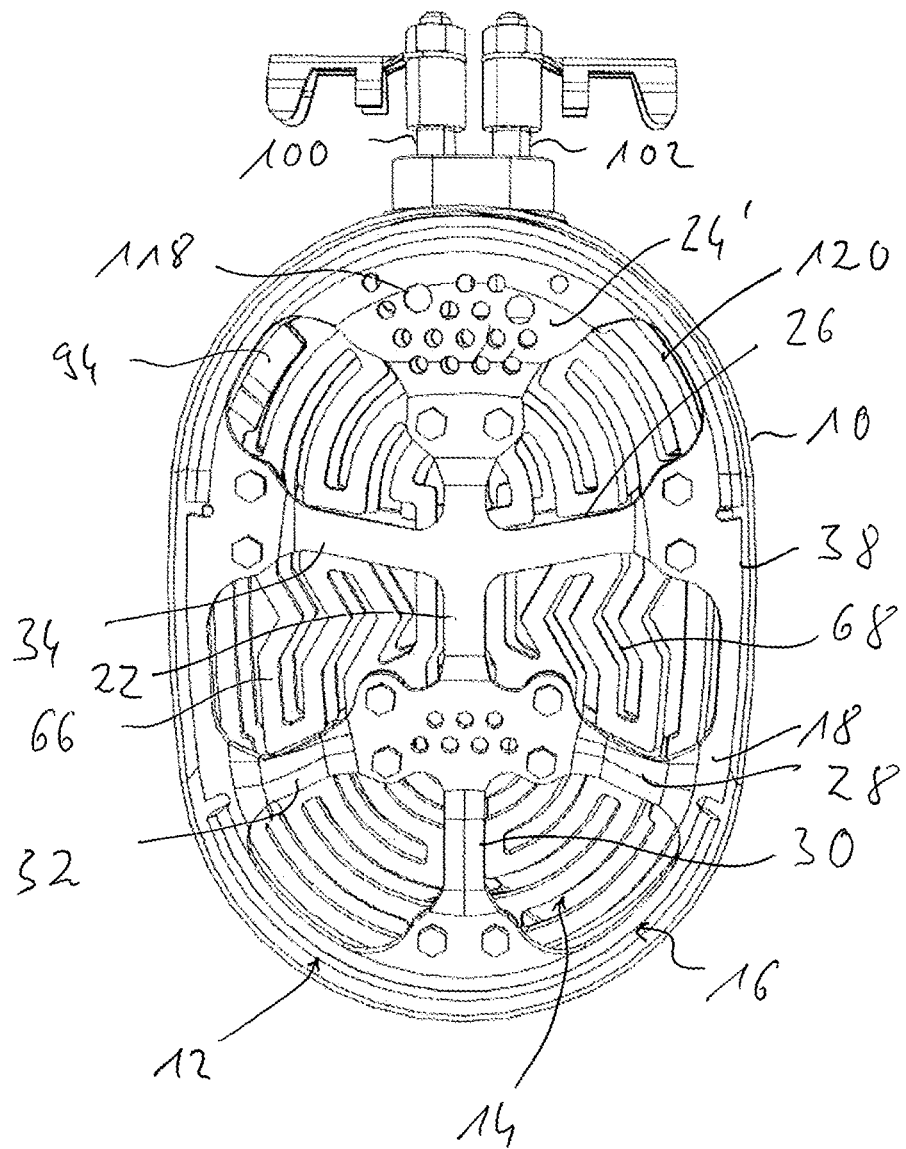
FIG. 8 is a view, corresponding to FIG. 1, of an alternative embodiment of an exhaust gas heater arranged in an exhaust gas guidance housing.
Figure 9:
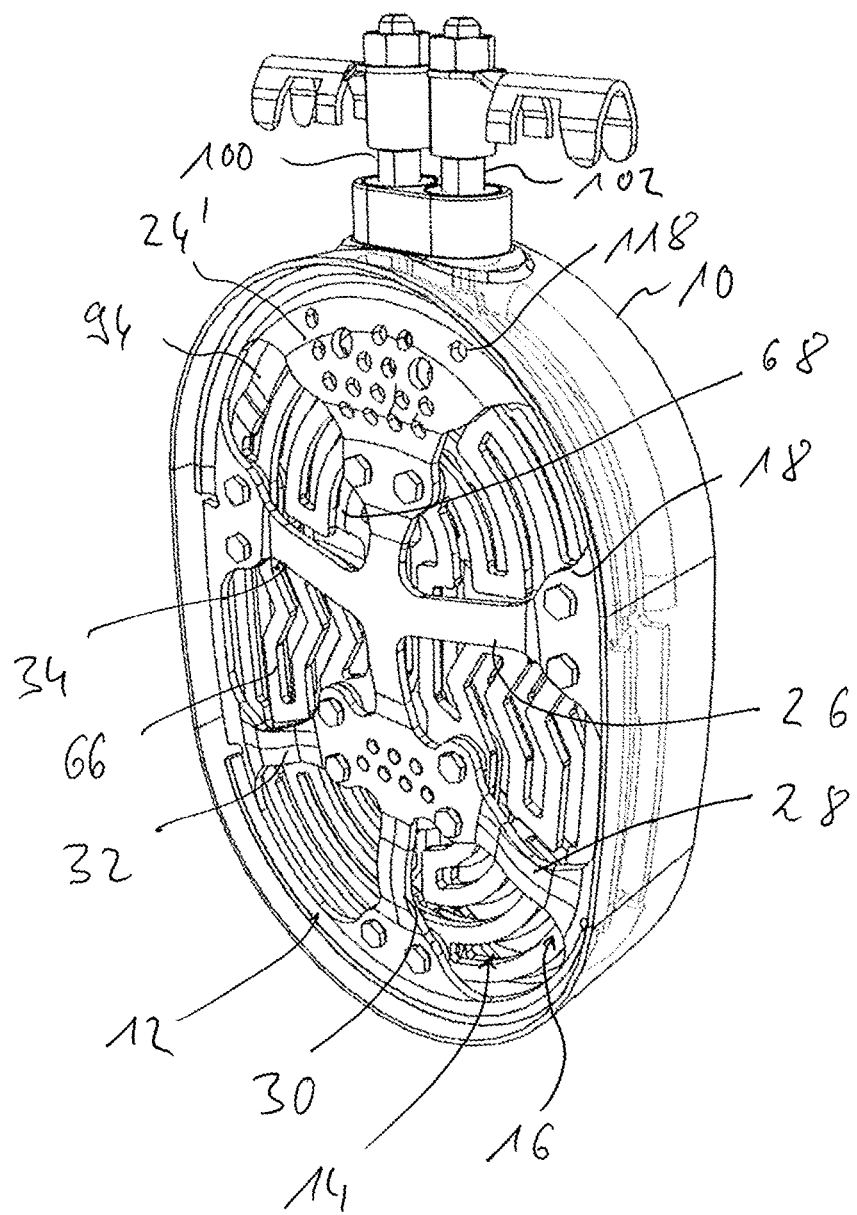
FIG. 9 is a perspective view of the exhaust gas heater from FIG. 8 in the exhaust gas guidance housing.
Figure 10:
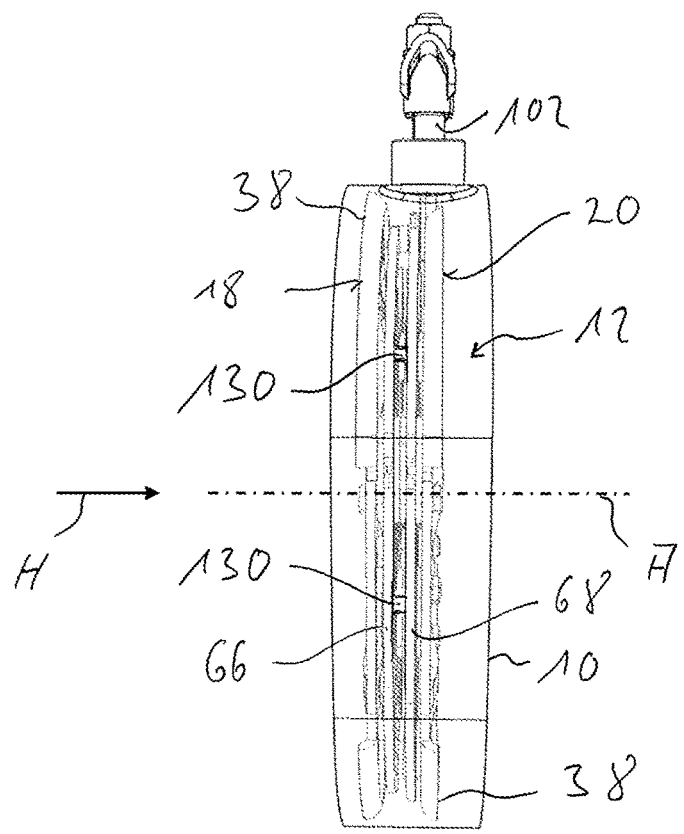
FIG. 10 is a side view of the exhaust gas heater from FIG. 8 in an exhaust gas guidance housing.
Figure 11:
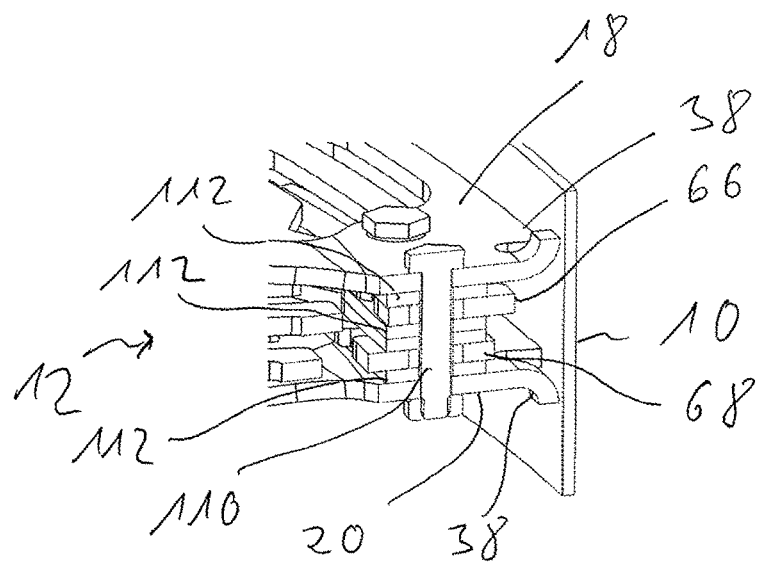
FIG. 11 is a partial longitudinal sectional view of the exhaust gas heater from FIG. 8.
Figure 12:
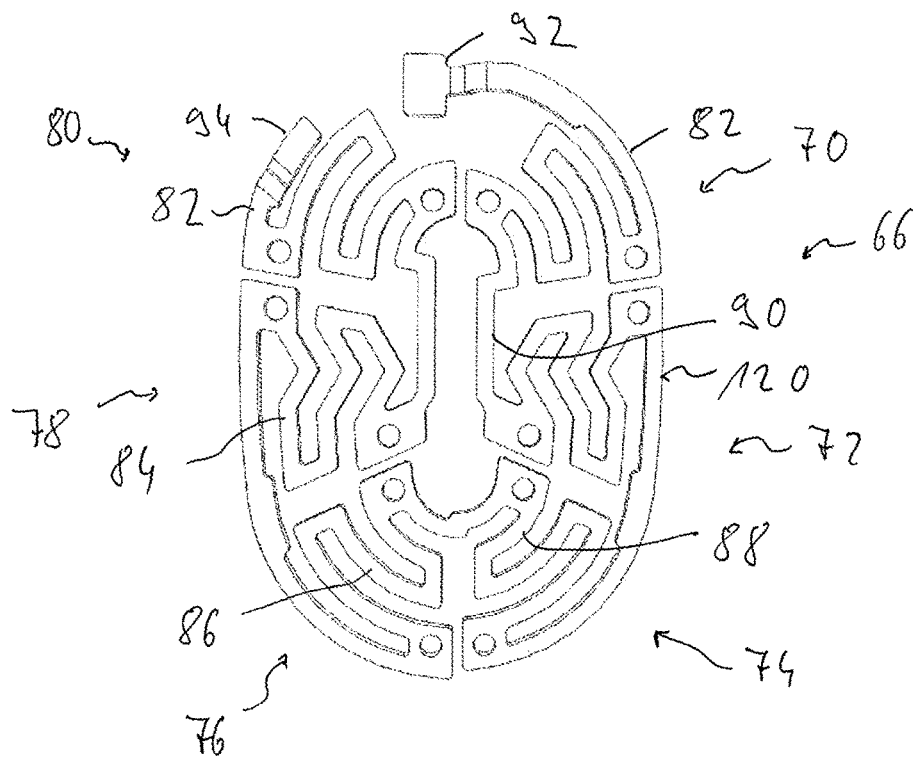
FIG. 12 is a first heating conductor, to be positioned further upstream, of a heating conductor arrangement of the exhaust gas heater from FIG. 8.
Figure 13:
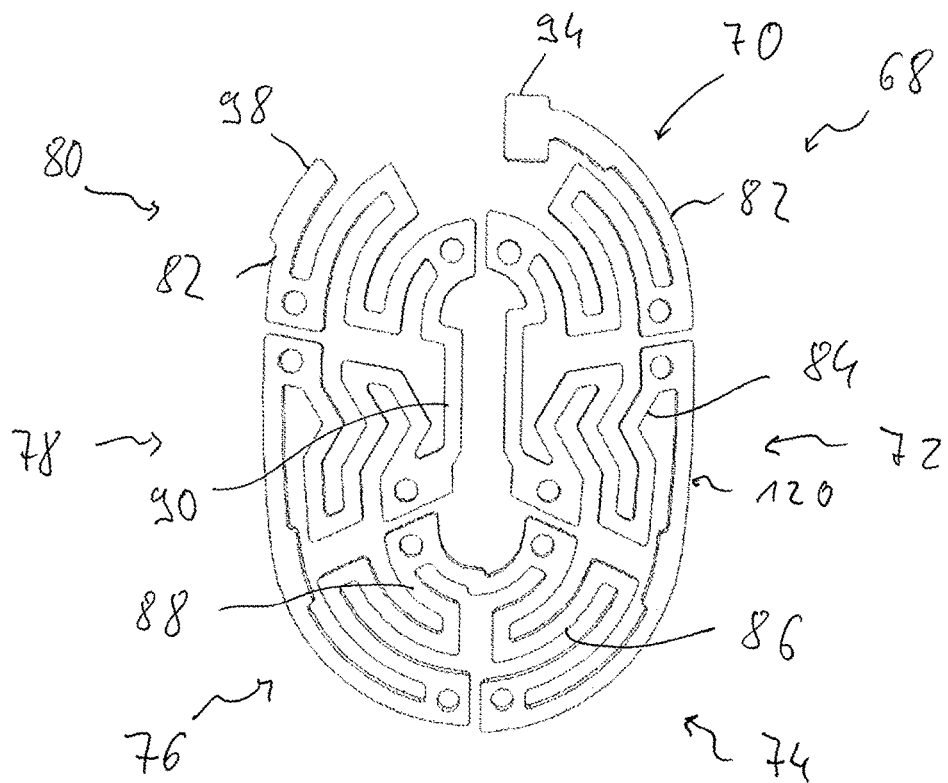
FIG. 13 is a second heating conductor, to be positioned further downstream, of the heating conductor arrangement of the exhaust gas heater from FIG. 8.

With the heating conductors 66, 68 lying behind one another in the direction of the exhaust gas heater center axis A and hence also in a main exhaust gas flow direction H, with an axially compact installation size, a comparatively large surface area is achieved for thermal interaction with the exhaust gas to be heated. In order to ensure that the second heating conductor 68 positioned further downstream is not positioned completely in the flow shadow of the first heating conductor 66 positioned further upstream, the two heating conductors 66, 68 have structures or courses of the individual meander winding portions 82, 84, 86, 88 which are not identical to one another. The combination shown in FIG. 7 illustrates this, in which it is evident that, in particular in the individual meander winding fields 70, 72, 74, 76, 78, 80, in particular the meander winding portions 84, 86, 88 of the two heating conductors 66, 68 do not lie fully congruently with one another but are offset radially to one another, so that the second heating conductor 68 positioned further downstream, at least in regions, protrudes transversely to the exhaust gas main flow direction H beyond the first heating conductor 66 positioned further upstream. As shown in FIG. 7, there is almost no cross-sectional region which is not covered by one of the two heating conductors 66, 68, so that even taking into account eddying or turbulence occurring on flow through the two heating conductors 66, 68, a highly efficient and even heating of the exhaust gas stream is achieved.

The arrangement may furthermore be such that the radially outer meander winding portions 82, which are substantially completely surrounded radially by the fixing region 38 and surrounded by U-shaped insulating material 104 so as to provide electrical insulation relative to the fixing regions 38 of the two carrier elements 18, 20, are substantially congruent with one another. Also, the radially inner meander winding portions 90 of the two heating conductors 66, 68 may be congruent with one another.

To produce a fixed connection of the two carrier elements 18, 20 to the two heating conductors 66, 68 positioned in between, in the region of some of the carrier arms, namely in the region of carrier arms 26, 30, 34, connecting formations 106 are provided, each having one or two connecting openings 108. Connecting elements 110, for example screw bolts or rivet bolts, may be passed through these connecting openings 108 and also corresponding openings in the heating conductors 66, 68, in order thus to achieve a secure axial connection. Such connecting formations 106 may also be provided in the central region 22. It should be pointed out that, in the combination shown in FIG. 7, the connecting formations 106 provided on the carrier arms 26, 28 and 34 and also on the central region 22, are representative.

In principle, the heating conductors 66, 68 may have a greater width or cross-sectional area in the regions in which they are covered by the carrier elements 18, 20, and hence shielded from exhaust gas contact flow, than in the regions which are substantially not shielded from exhaust gas contact flow, so as to generate less heat in the shielded regions because of the locally lower electrical resistance than in the unshielded regions. In the substantially unshielded regions, for example a cross-sectional dimension of the meander winding portions may lie in the range from 2 mm×4 mm to 4 mm×2 mm.

Figure 21:
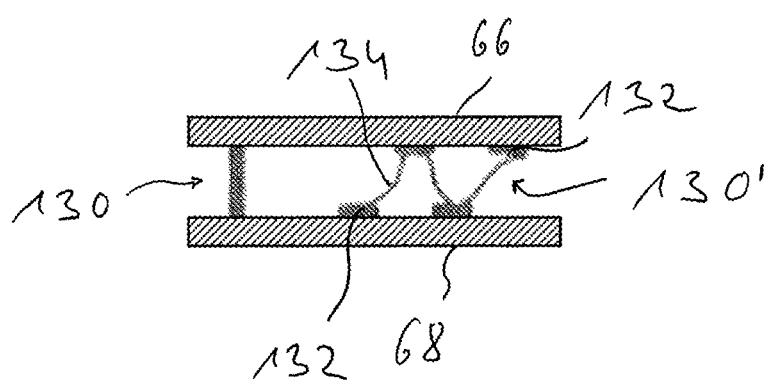
FIG. 21 shows bracing elements arranged between two heating conductors.

To further increase stability, bracing elements 130—shown as an example in FIG. 21—may be arranged between the heating conductors 66, 68 or various parts of their meander winding portions. These elements may provide a connection between meander winding portions of the heating conductors 66, 68 lying behind one another in the flow direction, so that in particular in the case of a comparatively thin configuration of the meander winding portions, these provide support for one another and are hence secured against vibrational excitation. In the case of parallel connection of the two heating conductors, the bracing elements 130 may be metal elements which are comparatively simple to produce and which can be fixedly connected to the heating conductors 66, 68, for example by material bonding such as, for example, soldering or welding. Because of the parallel connection of the heating conductors 66, 68, such local line bridges have no substantial effect on the conduction behavior, and hence also on the heating behavior of the heating conductors 66, 68, if the two heating conductors have approximately an identical form. Alternatively, such bracing elements 130 may be made of non-conductive materials, such as for example ceramic material or heat-resistant plastic material, and be connected to the heating conductors 66, 68 for example by bonding or latching or similar. Such a configuration is particularly suitable if the heating conductors 66, 68 are interconnected in series.

Figure 3:
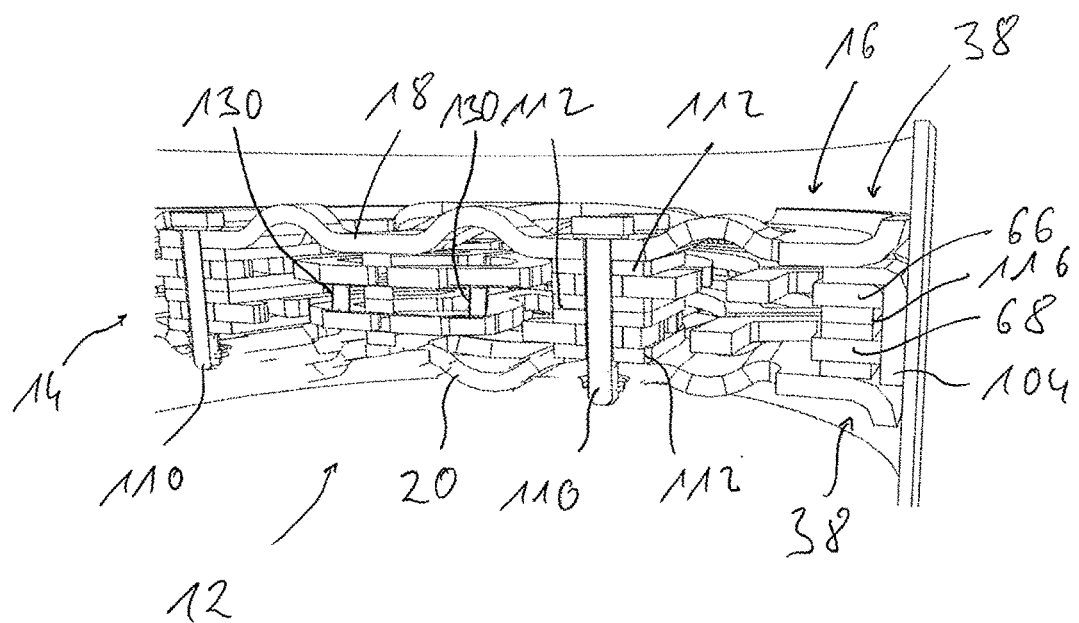
FIG. 3 is a partial longitudinal sectional view of the exhaust gas heater inserted in the exhaust gas guidance housing.

Since such bracing elements 130 can achieve a stable connection of the two heating conductors 66, 68, it is possible to configure the carrier elements 18, 20 for example with a smaller number of carrier arms or a smaller number of fixing regions in which the two heating conductors 66, 68 are secured to the carrier elements 18, 20, for example by the connecting elements 110 shown in FIG. 3. In this way, a larger cross-sectional region of the heating conductors 66, 68 is available for exposure to the exhaust gas flow. A further effect generated by the introduction of such bracing elements is to enlarge the surface area of the exhaust gas heater 12 over which the exhaust gas can flow and which is hence usable for heat transmission.

FIG. 21 shows two different embodiments of such bracing elements 130, 130'. The bracing element 130 shown on the left in FIG. 21 is configured as a bar and extends approximately orthogonally to the meander winding portions of the heating conductors 66, 68 which it connects. The bracing element 130' shown on the right in FIG. 21 has several fixing feet 132 established on the heating conductors 66, 68, between which curved connecting portions 134 extend. Because of the offset of the fixing feet 132, connected together by the respective connecting portions 134, and because of the curved structure of the connecting portions 134, a rigid coupling is avoided and an elasticity is introduced which may contribute further to vibration damping or allow a slight movement of the heating conductors 66, 68 relative to one another even in the coupled regions.

Figure 19:
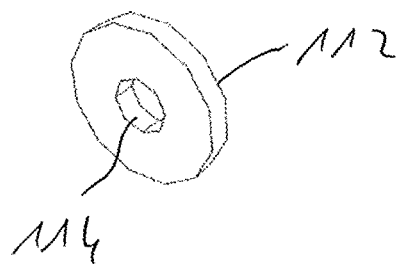
FIG. 19 is an insulating element for a heating conductor arrangement.

In order to avoid an electrical short-circuit in the region of the connection of the two carrier elements 18, 20 to one another and to the two heating conductors 66, 68, disk-like insulating elements 112 for example are inserted between each of the two heating conductors 66, 68 and its directly adjacent carrier element 18, 20, and between the two heating conductors 66, 68. Such an insulating element 112 is shown in FIG. 19 and has a central opening 114, through which a respective connecting element 110 can be guided. Also, insulating material 116, for example with a generally ring-like structure, may be arranged between the two heating conductors 66, 68, in particular their radially outer meander winding portions 82, in the radially outer region where the two heating conductors 66, 68 are surrounded by a generally U-shaped structure of the insulating material 104, so as to provide electrical insulation against the fixing regions 38 of the carrier element 18, 20.

Figure 2:
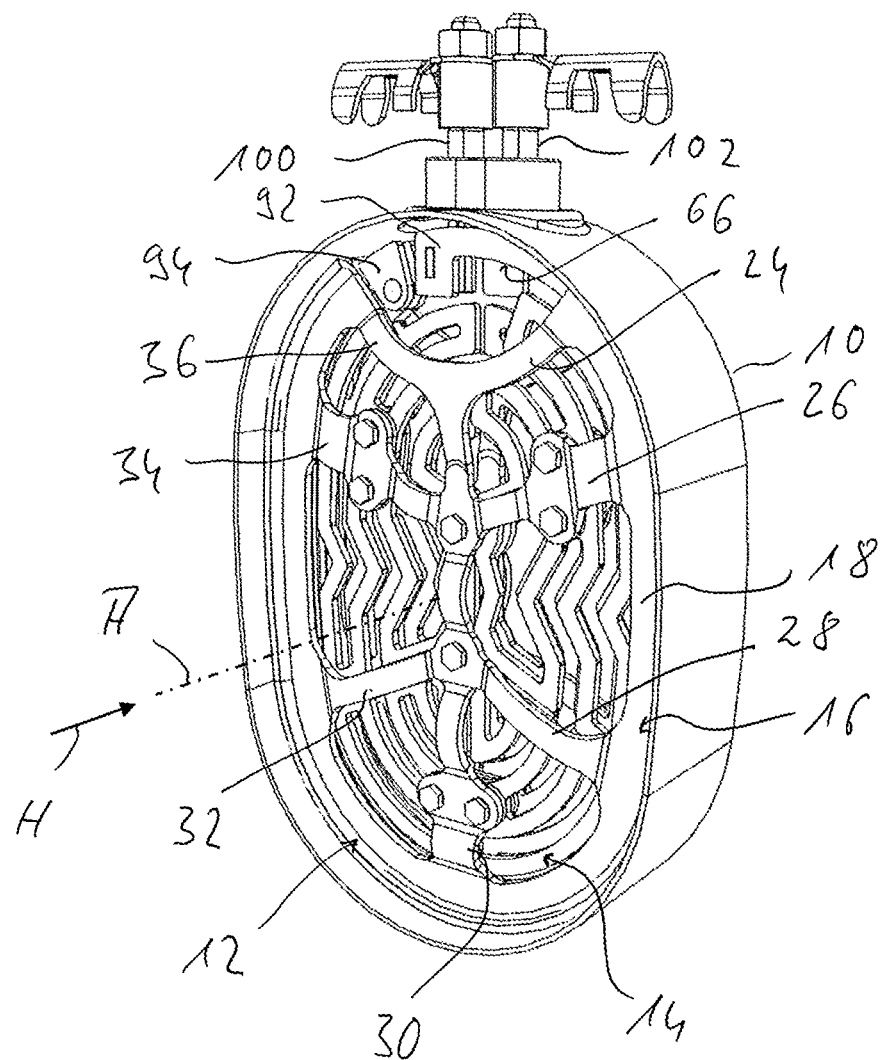
FIG. 2 is the exhaust gas heater from FIG. 1 in the exhaust gas guidance housing, in perspective view.

In FIG. 2, it is evident that, because no fixing edge is formed between the two carrier arms 24, 36 of the carrier elements 18, 20, the region in which the two heating conductors 66, 68 are connected to the connecting elements 100, 102, for example, by welding or soldering or by form fit, is exposed. Thus when an exhaust gas heater 12 is inserted in the exhaust gas guidance housing 10, it is still possible to obtain access to the first connecting regions 92, 96 in order to be able to attach these electrically conductively to the portions of the connecting elements 100, 102 protruding into the interior of the exhaust gas guidance housing 10. Since this access exists from both axial sides, that is, for both carrier elements 18, 20, each first connecting region 92, 96 may be reliably connected to the respective associated connecting element 100 or 102.

With the structure of an exhaust gas heater 12 shown in FIGS. 1 to 7, with an axially compact configuration, a comparatively large interaction area is achieved for heating the exhaust gas flowing through the exhaust gas heater 12. In the radially outer region of the two heating conductors 66, 68, that is, in particular the radially outer meander winding portions 82 of the individual meander winding fields 70, 72, 74, 76, 78, 80, the two heating conductors 66, 68 are substantially completely covered by the fixing regions 38 of the carrier elements 18, 20 both radially and in the circumferential direction. In order to avoid a heat build-up there, as clearly evident in FIGS. 5 and 6, these radially outer meander winding portions 82 are constructed with a greater radial width and hence larger cross-sectional area, and accordingly also lower electrical resistance, than the further radially inner lying meander winding portions 84, 86, 88, 90 around which exhaust gas can flow. Because of the lower electrical resistance, less heat occurs in the radially outer meander winding portions 82 which have a substantially constant radial width in the circumferential direction, so that even the substantially complete surrounding or covering of these radially outer meander winding portions 82 by the insulating material 104 or the fixing regions 38 of the carrier elements 18, 20 does not lead to the occurrence of a heat build-up.

In order to improve the thermal interaction with the exhaust gas or to influence the exhaust gas flow, the heating conductors 66, 68, which are arranged following one another in the main exhaust gas flow direction H, may be configured or dimensioned differently from one another and be made from different materials.

A modified embodiment of an exhaust gas heater is described below with reference to FIGS. 8 to 18. Assemblies which correspond to above-described components or assemblies with respect to structure and function are designated with the same reference signs.

It is pointed out that the basic structure of the exhaust gas heater in FIGS. 8 to 18, or an exhaust gas system constructed therewith, corresponds to the structure described above in relation to FIGS. 1 to 7. With respect to the basic structure of the embodiment of an exhaust gas heater shown in FIGS. 8 to 18, reference is therefore made to the statements above. Substantially, only differences from the above-described embodiment are discussed below.

Figure 14:
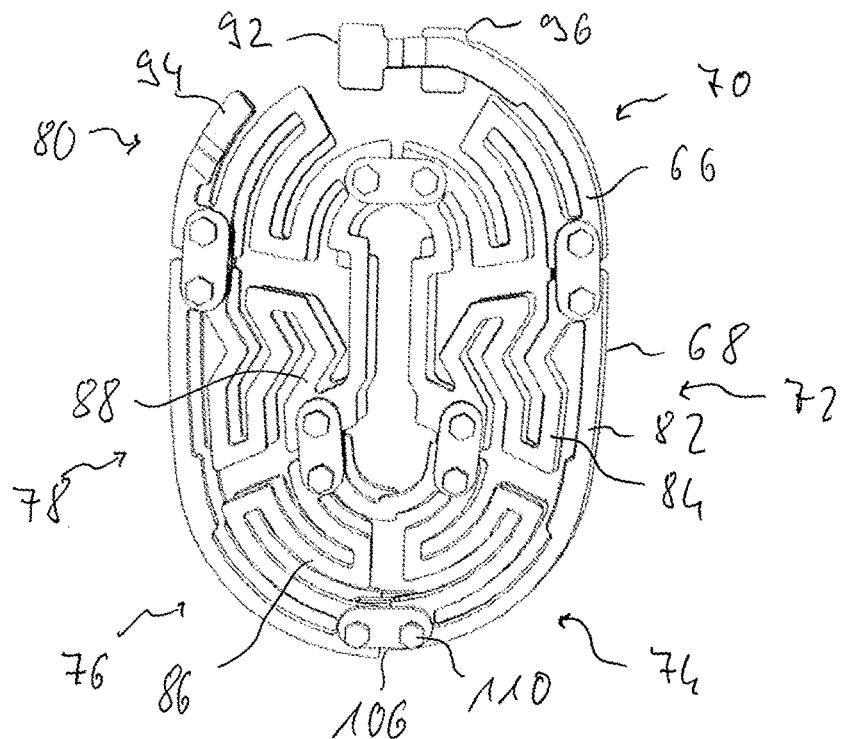
FIG. 14 shows the heating conductors from FIGS. 12 and 13 together.
Figure 15:
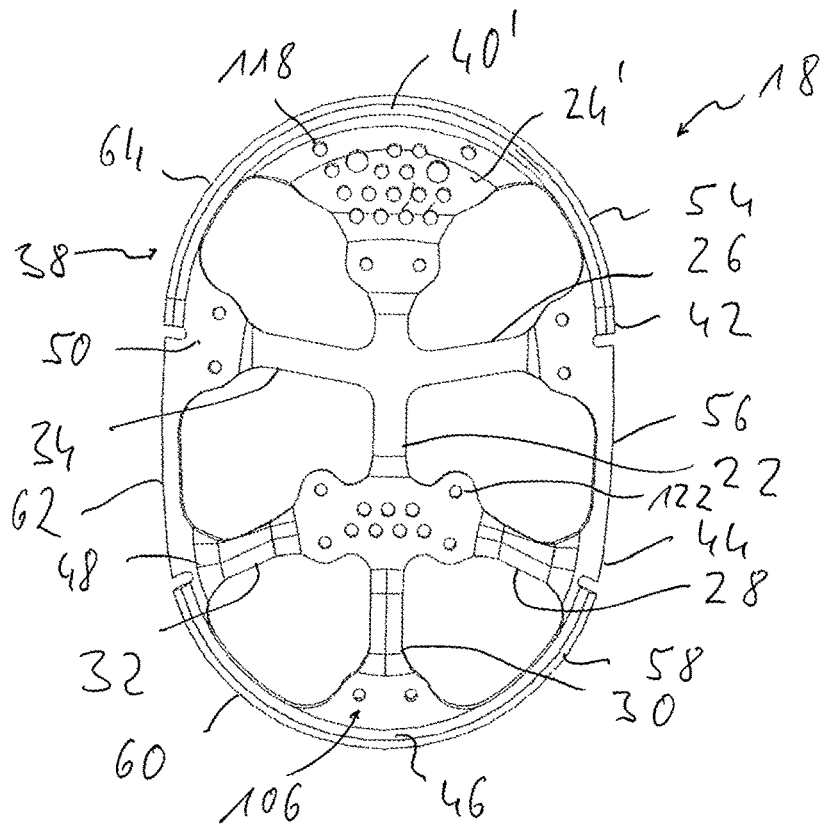
FIG. 15 is an upstream carrier element of a carrier arrangement of the exhaust gas heater from FIG. 8.
Figure 16:
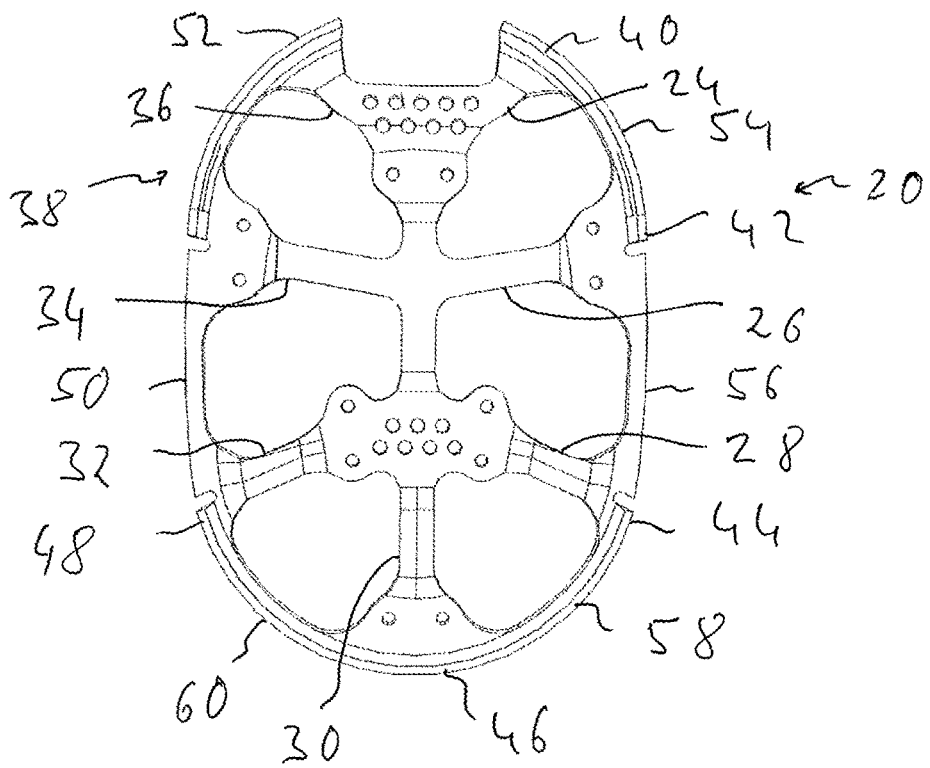
FIG. 16 is a downstream carrier element of the carrier arrangement of the exhaust gas heater from FIG. 8.

The exhaust gas heater 12 from FIGS. 8 to 18 differs from the above-described exhaust gas heater substantially in the configuration of the two carrier elements 18, 20 of the carrier arrangement 16. The upstream carrier element 18 of this exhaust gas heater 12 is shown in FIG. 15. The downstream carrier element 20 of this exhaust gas heater 12 is shown in FIG. 16. In a comparison of FIGS. 15 and 16, it is clear that in this embodiment of an exhaust gas heater 12, the two carrier elements 18, 20 are configured differently from one another. In particular, the upstream carrier element 18 is configured such that, in the region in which the two heating conductors 66, 68 of this exhaust gas heater 12 are connected to the connecting elements 100, 102, on the upstream side of the exhaust gas heater 12, it shields the elements from a direct exhaust gas contact flow, while in the downstream carrier element 20 between the carrier arms 24, 36 starting from the central region 22, a cutout is left (as before) on the radial outside, that is, the fixing region 38 is interrupted and no fixing edge is provided between the fixing portions 40, 52. In this way, as before, access is achieved from the downstream side to the region in which the two heating conductors 66, 68 are to be connected to the connecting elements 100, 102.

In the case of the upstream carrier element 18, in the area covering the connection of the two heating conductors 66, 68 to the connecting elements 100, 102, the two carrier arms 24, 36 of the downstream carrier element 20 have a combined unitary carrier arm 24', which also provides a circumferentially continuous fixing region 38 in this area, with a fixing portion 40' extending over a larger circumferential region. In order to avoid a complete shadowing in this area, several for example differently dimensioned passage openings 118 may be provided in the carrier arm 24'.

The reason for this configuration of the upstream carrier element 18 is that, as shown in FIG. 14, in this area the two heating conductors 66, 68 have no meander winding portions of the meander winding fields 70, 80, except for the meander winding portions 82 each providing a respective first connecting region 92 or 96 at their peripheral ends. Covering this area with the carrier arm 24' prevents a larger part of the exhaust gas, which should flow onto the exhaust gas heater 12, from passing through this opening region without coming into thermal interaction with one of the two heating conductors 66, 68. Therefore, downstream of the exhaust gas heater 12, the temperature of the exhaust gas heated at the exhaust gas heater 12 is more evenly distributed over the periphery.

Figure 4:
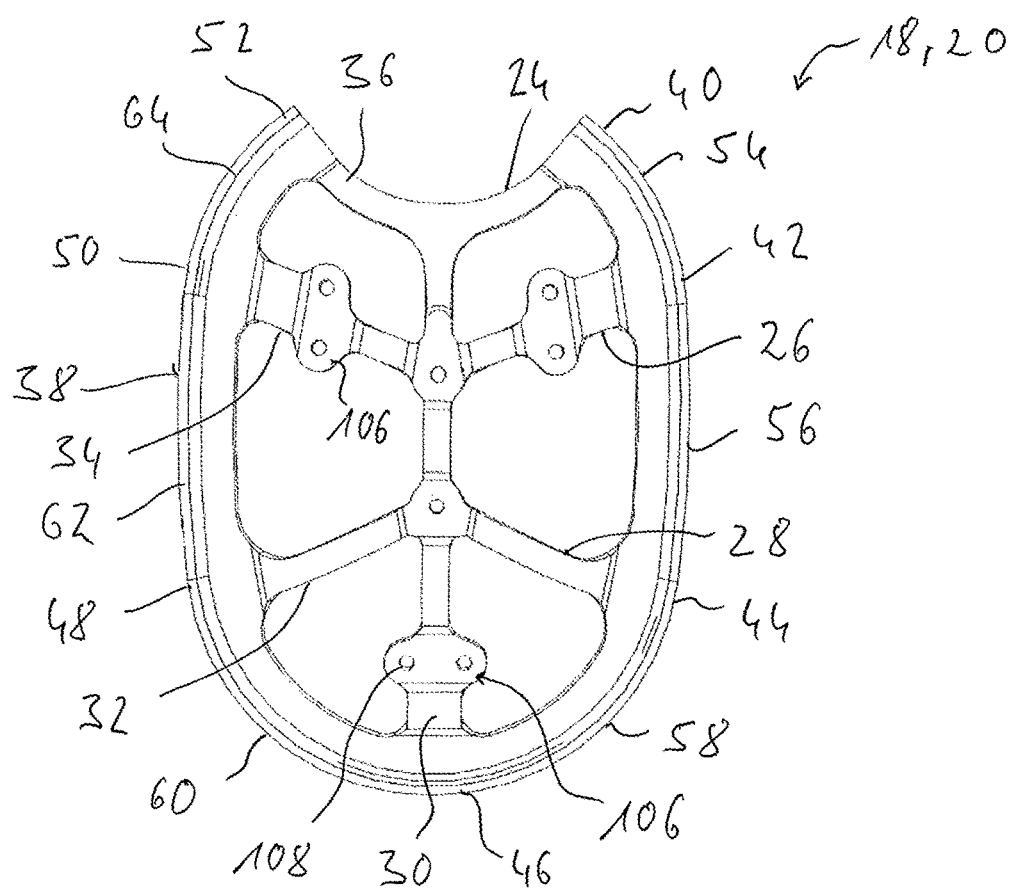
FIG. 4 is a carrier element of a carrier arrangement of the exhaust gas heater from FIG. 1.

FIGS. 15 and 16, in particular in comparison with FIG. 4, show that in the case of the carrier elements 18, 20 of the exhaust gas heater 12 of the second embodiment, the fixing edges 54, 56, 58, 60, 62, 64 extending between the fixing portions 40', 42, 44, 46, 48, 50 of the carrier arms 24', 26, 28, 30, 32, 34 have a significantly smaller radial width, that is, extend less far towards the radial inside. As a result, in the region between the carrier arms 24', 26, 28, 30, 32, 34, the carrier elements 18, 20 do not radially inwardly overlap the heating conductors 66, 68 received between these in their respective radially outer meander winding portions 82, and hence do not substantially cover these radially. It is clear in FIG. 8 that in the peripheral regions between the fixing portions 40', 42, 44, 46, 48, 50, for each of the heating conductors 66, 68, the radially outer meander winding portions 82 providing a radially outer conductor region 120 are not shielded from exhaust gas contact flow. This enlarges the region of the heating conductors 66, 68 around which exhaust gas can flow and hence leads to a more efficient thermal interaction with the exhaust gas flowing through the exhaust gas heater 12.

In order to achieve an approximately similar heating characteristic in the radially outer region of the heating conductors 66, 68 as in the further radially inner lying regions, the radially outer meander winding portions 82, in the regions in which they are not covered by the carrier arms 24', 26, 28, 30, 32, 34, have a smaller width and hence a smaller cross-sectional area than in the regions which are covered by the carrier arms 24', 26, 28, 30, 32, 34. In particular, in these uncovered regions, the radially outer meander winding portions 82 have for example the same width and hence the same cross-sectional area as the meander winding portions 84, 86, 88, 90 lying radially further inward, in particular in their regions not covered by the carrier arms 24', 26, 28, 30, 32, 34 or by the central region 22. Because of the smaller cross-sectional area and the resulting increased electrical resistance, in these regions of the radially outer meander winding portions 82 also, more heat occurs than in their regions formed with larger cross-sections and covered by the carrier arms 24', 26, 28, 30, 32, 34, so that a heat build-up is avoided in these covered regions because of the lower heat occurrence. For example, the cross-sectional area of the meander winding portions in the regions which are not or substantially not covered by the carrier elements 18, 20, as in the embodiment of FIGS. 1 to 7, may lie in the range from approximately 2 mm×4 mm to approximately 4 mm×2 mm.

Since the radially outer meander winding portions 82 of the heating conductors 66, 68, which each provide the radially outer conductor regions 120, are not covered by the carrier elements 18, 20 in the regions lying between the fixing portions 40', 42, 44, 46, 48, 50, in this embodiment of the exhaust gas heater 12, radially on the outside there is no, for example, U-shaped insulating material surrounding the heating conductors 66, 68. Rather, in this region, the heating conductors 66, 68 are substantially free between the two carrier elements 18, 20. Electrical insulation and a defined positioning of the heating conductors 66, 68 are achieved substantially only in the region of the connecting elements 110 by the insulating elements 112 shown in FIG. 19.

FIGS. 15 and 16 furthermore show that also the central region 22 is configured more solidly, in particular in the transition to the two carrier arms 28, 32, in order, in this region also, to prevent the passage of exhaust gas where there are no meander winding portions, in adaptation to the configuration of the heating conductors 66, 68. Here again however, to avoid a complete flow build-up, passage openings 122 are formed in the carrier elements 18, 20.

Figure 17:
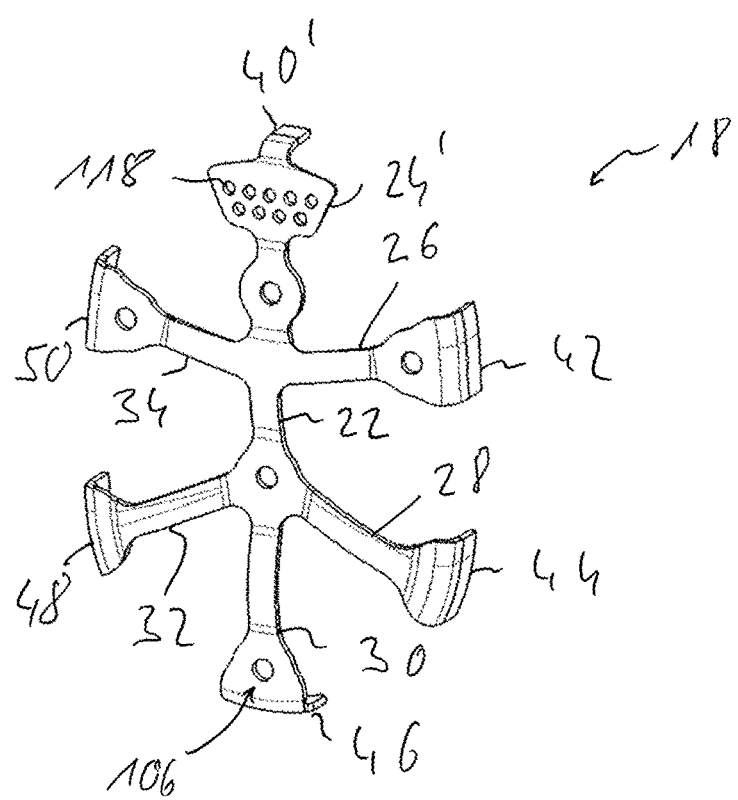
FIG. 17 is an alternative embodiment of an upstream carrier element.
Figure 18:
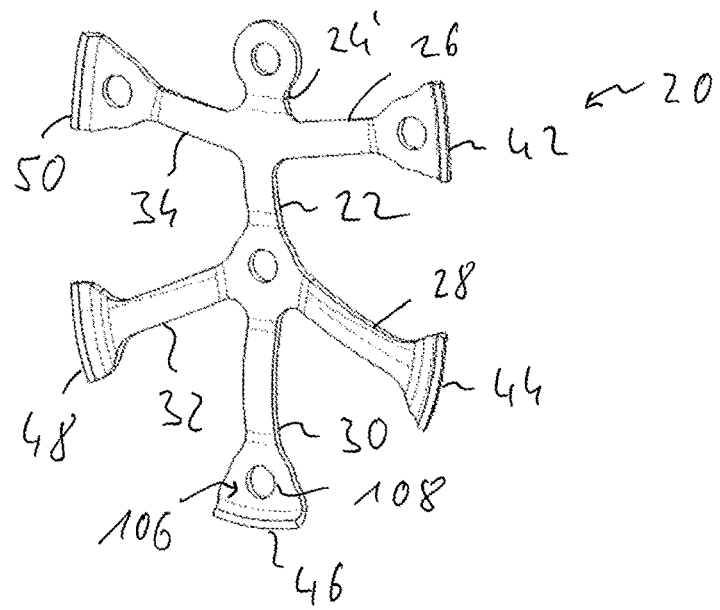
FIG. 18 is an alternative embodiment of a downstream carrier element.

A modified embodiment of these carrier elements 18, 20 is shown in FIGS. 17, 18. In the case of these carrier elements 18, 20, the carrier arms 24, 26, 28, 30, 32, 34 are not interconnected in their radially outer end regions, that is, at the respective fixing portions 40', 42, 44, 46, 48, 50. Thus there are no fixing edges extending between the fixing portions 40', 42, 44, 46, 48, 50. As a result, an even larger region of the radially outer conductor regions 120, or radially outer meander winding portions 82 of the two heating conductors 66, 68, is not covered by the carrier elements 18, 20.

When the exhaust gas heater 12 is configured with carrier elements 18, 20 with the structure described above in relation to the second embodiment, wherein the fixing region 38 does not cover the heating conductors 66, 68 radially outwardly, the exhaust gas heater 12 may be constructed with a different number of heating conductors, for example with only one heating conductor or more than two heating conductors.

Furthermore, it is pointed out that, irrespective of the configuration of the fixing region 38, either as a structure which is substantially continuous in the circumferential direction with fixing portions in the region of the carrier arms and fixing edges between at least some of these fixing portions, or as a structure interrupted in the circumferential direction with discrete fixing portions, it is not necessary to use the entire fixing region 38 for securing the fixing region 38 to the exhaust gas guidance housing 10. Discrete welding points may be applied, so that for example in the region of individual fixing portions and/or fixing edges, no connection is created to the inside of the exhaust gas guidance housing.

Figure 20:
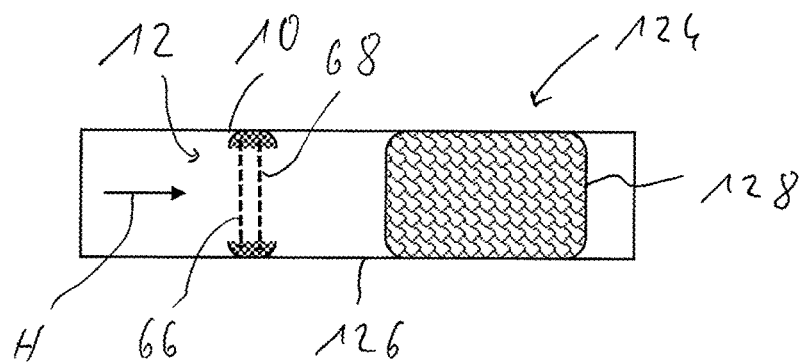
FIG. 20 is a general illustration of an exhaust gas system.

FIG. 20 shows in a general illustration the structure of an exhaust gas system 124, wherein an exhaust gas treatment arrangement 128 is arranged in a tubular housing 126 which carries exhaust gas and which may also provide or include the exhaust gas guidance housing 10 for the exhaust gas heater 12. The exhaust gas treatment arrangement may for example include a particle filter, a catalyst, for example, an oxidation catalyst, SCR catalyst, for example, on a particle filter, a lean NOx trap (LNT), a passive nitrogen oxide absorber (PNA), a three-way catalyst, a four-way catalyst, or several such system regions. Upstream relative to the exhaust gas treatment arrangement 128 in the main exhaust gas flow direction H, the exhaust gas heater 12 is provided with the two heating conductors 66, 68, following one another in the flow direction, on the carrier structure 16 (illustrated merely in principle). The exhaust gas flowing onto the exhaust gas heater 12 in the main exhaust gas flow direction H may, in particular at the start of combustion operation of an internal combustion engine, receive heat by application of an electrical voltage to the heating conductors 66, 68 in the region of the exhaust gas heater 12, and deliver this into the exhaust gas treatment arrangement 128 which follows in the downstream direction. The latter is thus very quickly heated, in particular also at the start of combustion operation, to a temperature necessary for performance of the reaction to be performed therein, for example a catalytic reaction. In principle, the integration of such an exhaust gas heater 12 is also possible between two exhaust gas treatment arrangements, for example, catalysts, which follow one another in the flow direction, wherein in particular the exhaust gas treatment arrangement arranged upstream relative to an exhaust gas heater 12 configured in this way is heated by the radiant heat emitted by the exhaust gas heater 12.

Finally, it should be pointed out that for the exhaust gas heater described above, wide-ranging variations may be made within the scope of the present disclosure. Thus for example, more than two heating conductors may be arranged following one another in the flow direction, wherein for example some of these heating conductors may be interconnected in series and some of these heating conductors may be interconnected in parallel. As in the embodiments described above, in the embodiment of the exhaust gas heater with more than two heating conductors, it may also be provided that the individual heating conductors differ with respect to their geometry, that is, in the course of their conductor regions, in order to avoid a substantially congruent positioning of two heating conductors following one another in the flow direction, and hence to guarantee an efficient thermal interaction between these and the exhaust gas. Also, the course of the conductor regions of the individual heating conductors may deviate from the above-described course or that shown in the figures. Thus, at points where it is necessary because of the flow characteristics in an exhaust gas guidance housing, more or a greater density of conductor regions or winding portions may be provided than in other regions. Also, for adaptation to the flow conditions, the conductor regions of the heating conductors may have a varying width and in some cases also a varying thickness, in order in this way to be able to set the electrical resistance and the heat occurring locally on application of an electric voltage in a defined fashion, and in particular to be able to avoid areas of local overheating.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of an internal combustion engine, the exhaust gas heater defining an exhaust gas heater center axis (A) and comprising:
   a carrier arrangement;
   a heating conductor arrangement carried on said carrier arrangement and being configured to pass exhaust gas therethrough in an exhaust gas main flow direction (H);
   said heating conductor arrangement having at least one heating conductor wherethrough current flows;
   said at least one heating conductor being made of metal material; and,
   wherein said carrier arrangement includes at least one carrier element having a fixing region lying radially outside relative to said exhaust gas heater center axis (A) and being configured for fixing to said exhaust gas guidance housing;
   said fixing region at least partially does not radially overlap a radially outer lying conductor region of said at least one heating conductor of said heating conductor arrangement in at least one circumferential region;
   wherein said at least one carrier element includes a plurality of carrier arms arranged spaced apart from one another in the circumferential direction and each providing radially outwardly a fixing portion of said fixing region; and,
   wherein at least one heating conductor of said at least one heating conductor has a greater conductor cross-sectional area in a region covered by a carrier arm than in a region not covered by a carrier arm.

2. The exhaust gas heater of claim 1, wherein said at least one heating conductor is made by separation from a flat metal material.

3. The exhaust gas heater of claim 1, wherein at least one of the following applies: a) at least one heating conductor of said heating conductor arrangement is configured so as to extend as a winding at least in regions thereof; b) said at least one of said heating conductors of the heating conductor arrangement has at least one meander winding field or a plurality thereof following one another in circumferential direction, wherein each meander winding field of said at least one meander winding field includes a plurality of meander winding portions arranged radially following one another relative to said exhaust gas heater center axis (A) and extending substantially in the circumferential direction, wherein, in association with at least one meander winding portion of the at least one meander winding portions, at least one of the following applies:
   i) said at least one meander winding portion at a first peripheral end thereof adjoins a radially further inwardly positioned meander winding portion; and
   ii) said at least one meander winding portion at a second peripheral end adjoins a radially further outwardly positioned meander winding portion.

4. The exhaust gas heater of claim 1, wherein said heating conductor arrangement includes at least two of said heating conductors arranged following one another in the main exhaust gas flow direction (H), and wherein said at least two heating conductors are electrically interconnected in series or in parallel.

5. The exhaust gas heater of claim 3, wherein said heating conductor arrangement includes at least two of said heating conductors arranged following one another in said exhaust gas main flow direction (H), and wherein in a first heating conductor of said at least two heating conductors, a radially outer meander winding portion of a meander winding field provides a first connecting region of the first heating conductor, and a radially outer meander winding portion of another meander winding field provides a second connecting region of the first heating conductor; and, in a second heating conductor of said at least two heating conductors, a radially outer meander winding portion of a meander winding field provides a first connecting region of the second heating conductor, and a radially outer meander winding portion of another meander winding field provides a second connecting region of the second heating conductor; wherein at least one of the following applies: a) with respect to said first heating conductor and said second heating conductor, respectively, at least one connecting region of the first connecting region and the second connecting region provides a voltage source connecting region for connection of the heating conductor arrangement to a voltage source; and, b) with respect to said first heating conductor and said second heating conductor, respectively, a connecting region of the first connecting region and the second connecting region provides a contact connecting region for serial electrical connection of said first heating conductor to said second heating conductor.

6. The exhaust gas heater of claim 1, wherein said heating conductor arrangement includes at least two of said heating conductors arranged following one another in the main exhaust gas flow direction (H), and wherein at least one of the following applies: a) said at least two heating conductors are arranged so as to be incongruent with one another transversely to the main exhaust gas flow direction (H); and, b) said at least two heating conductors following one another in the main exhaust gas flow direction (H) are carried between the carrier elements of said carrier arrangement.

7. The exhaust gas heater of claim 3, wherein said heating conductor arrangement includes at least two of said heating conductors arranged following one another in said exhaust gas main flow direction (H), and wherein, with respect to at least one meander winding field, at least one meander winding portion of one of said heating conductors is incongruent, transversely to the main exhaust gas flow direction (H), with a meander winding portion following in the main exhaust gas flow direction (H), of another of the heating conductors.

8. The exhaust gas heater of claim 1, wherein said heating conductor arrangement includes at least two of said heating conductors arranged following one another in the main exhaust gas flow direction (H), and at least two heating conductors are supported relative to one another by at least one bracing element.

9. The exhaust gas heater of claim 3, wherein at least one bracing element extends between meander winding portions of two heating conductors.

10. The exhaust gas heater of claim 1, wherein there is no connection in the circumferential direction between the fixing portions of at least two carrier arms following one another in the circumferential direction.

11. The exhaust gas heater of claim 1, wherein the fixing portions of at least two of said carrier arms following one another in the circumferential direction are connected together in the circumferential direction by a fixing edge.

12. The exhaust gas heater of claim 1, wherein at least one of the following applies: a) the carrier arms of said at least one carrier element extend radially outwardly from a central region of said at least one carrier element; and, b) at least one connecting formation is provided at least on some of said carrier arms of said at least one carrier element; and, c) on a central region of the at least one carrier element, at least one connecting formation is provided for fixedly connecting said at least one carrier element to the heating conductor arrangement.

13. The exhaust gas heater of claim 1, wherein an upstream carrier element and a downstream carrier element are provided; and, said heating conductor arrangement is arranged between the upstream carrier element and the downstream carrier element in the main exhaust gas flow direction (H).

14. The exhaust gas heater of claim 1, wherein at least one carrier element substantially shields at least one voltage source connecting region of the heating conductor arrangement from direct exhaust gas contact flow.

15. An exhaust gas heating arrangement for an exhaust gas system of an internal combustion engine, the exhaust gas heating arrangement comprising:
at least one exhaust gas heater;
said exhaust gas heater defining an exhaust gas heater center axis (A) and including:
a carrier arrangement;
a heating conductor arrangement carried on said carrier arrangement and being configured to pass exhaust gas therethrough in an exhaust gas main flow direction (H);
said heating conductor arrangement having at least one heating conductor wherethrough current flows;
said at least one heating conductor being made of metal material; and,
wherein said exhaust gas heater further includes an exhaust gas guidance housing;
said carrier arrangement includes at least one carrier element having a fixing region lying radially outside relative to said exhaust gas heater center axis (A) and being configured for fixing to said exhaust gas guidance housing;
said fixing region at least partially does not radially overlap a radially outer lying conductor region of said at least one heating conductor of said heating conductor arrangement in at least one circumferential region;
wherein said at least one carrier element includes a plurality of carrier arms arranged spaced apart from one another in the circumferential direction and each providing radially outwardly a fixing portion of said fixing region; and,
wherein at least one heating conductor of said at least one heating conductor has a greater conductor cross-sectional area in a region covered by a carrier arm than in a region not covered by a carrier arm.

16. An exhaust gas system for an internal combustion engine, comprising:
at least one exhaust gas heater;
said exhaust gas heater defining an exhaust gas heater center axis (A) and including:
a carrier arrangement;
a heating conductor arrangement carried on said carrier arrangement and being configured to pass exhaust gas therethrough in an exhaust gas main flow direction (H);
said heating conductor arrangement having at least one heating conductor wherethrough current flows;
said at least one heating conductor being made of metal material; and,
wherein said exhaust gas heater further includes an exhaust gas guidance housing;
said carrier arrangement including at least one carrier element having a fixing region lying radially outside relative to said exhaust gas heater center axis (A) and being configured for fixing to said exhaust gas guidance housing;

said fixing region at least partially does not radially overlap a radially outer lying conductor region of said at least one heating conductor of said heating conductor arrangement in at least one circumferential region;

wherein said at least one carrier element includes a plurality of carrier arms arranged spaced apart from one another in the circumferential direction and each providing radially outwardly a fixing portion of said fixing region; and, wherein at least one heating conductor of said at least one heating conductor has a greater conductor cross-sectional area in a region covered by a carrier arm than in a region not covered by a carrier arm.

* * * * *